(12) United States Patent
Laycock et al.

(10) Patent No.: US 8,589,631 B2
(45) Date of Patent: Nov. 19, 2013

(54) COHERENCY CONTROL WITH WRITEBACK ORDERING

(75) Inventors: Christopher William Laycock, Sheffield (GB); Antony John Harris, Hope Valley (GB); Bruce James Mathewson, Papworth Everard (GB); Stuart David Biles, Bury St Edmunds (GB)

(73) Assignee: ARM Limited, Cambridge (GB)

( * ) Notice: Subject to any disclaimer, the term of this patent is extended or adjusted under 35 U.S.C. 154(b) by 4 days.

(21) Appl. No.: 13/137,780

(22) Filed: Sep. 12, 2011

(65) Prior Publication Data

US 2012/0079211 A1  Mar. 29, 2012

(30) Foreign Application Priority Data

Sep. 28, 2010  (GB) .................................. 1016326.9

(51) Int. Cl.
*G06F 12/00* (2006.01)

(52) U.S. Cl.
USPC ..... 711/141; 711/143; 711/147; 711/E12.038

(58) Field of Classification Search
USPC ............................ 711/141, 143, 147, E12.038
See application file for complete search history.

(56) References Cited

U.S. PATENT DOCUMENTS

| | | | | |
|---|---|---|---|---|
| 5,684,977 | A * | 11/1997 | Van Loo et al. ............... | 711/143 |
| 6,038,644 | A * | 3/2000 | Irie et al. ........................ | 711/141 |
| 2006/0265466 | A1 | 11/2006 | Yasui et al. | |
| 2008/0320233 | A1 * | 12/2008 | Kinter ........................... | 711/143 |
| 2009/0193232 | A1 | 7/2009 | Watanabe | |
| 2010/0325367 | A1 * | 12/2010 | Kornegay et al. .............. | 711/143 |
| 2011/0191543 | A1 * | 8/2011 | Craske et al. .................. | 711/131 |

FOREIGN PATENT DOCUMENTS

GB  2 460 337  12/2009

OTHER PUBLICATIONS

Search Report for UK 1016326.9, dated Jan. 24, 2011.

* cited by examiner

*Primary Examiner* — Edward Dudek, Jr.
(74) *Attorney, Agent, or Firm* — Nixon & Vanderhye P.C.

(57) ABSTRACT

Interconnect circuitry configured to provide routes for interconnecting several initiator devices and at least one recipient device including a memory. At least one of the initiator devices has a cache for storing a local copy of a subset of data items stored in the memory. The interconnect circuitry includes: a plurality of input ports and at least one output port; a plurality of paths for transmitting the transaction requests between the inputs and the at least one output; coherency control circuitry for maintaining an order in which at least some of the transaction requests to a same data storage location proceed through the interconnect circuitry. The interconnect circuitry is configured not to control the writeback transaction requests with the coherency control circuitry, such that the writeback transaction requests proceed independently of transaction requests routed through the coherency control circuitry.

21 Claims, 6 Drawing Sheets

COHERENCY CONTROL WITH WRITEBACK ORDERING

This application claims priority to GB Application No. 1016326.9 filed 28 Sep. 2010, the entire contents of which are incorporated herein by reference.

BACKGROUND OF THE INVENTION

1. Field of the Invention

The present invention relates to the field of data processing and in particular, to maintaining the coherency of data in a system made up of a plurality of masters connected via an interconnect to at least one memory for storing data, the system having local storage for copies of a subset of the data in one or more of the masters and possibly in the interconnect.

2. Description of the Prior Art

There are coherency issues associated with systems where a plurality of initiator devices or masters are connected via interconnect circuitry to a memory, and where there is local data storage provided for a subset of the data in the interconnect and/or in the initiator devices.

To address these issues coherent interconnects have been devised that have coherency control circuitry within them for maintaining an ordering of transaction requests that pass through them and for ensuring that if a data item is requested, the current version of the item is returned. The coherency control circuitry acts by generating snoop transactions (formed of a snoop request, a snoop response and optionally snoop data) that query the state of local stores such as caches and the values stored therein and ensure that the most up-to-date version of a requested data item is returned. When a copy in the local store is overwritten with a new value, this local copy is marked as dirty so that it is clear when a snoop is performed that this is the most recent version of that data item. At some point later the system will perform a writeback to write this new value to memory, whereupon the local copy is no longer marked as dirty and the memory also holds the most recent version.

The present technique recognises that as a consequence of the variable delays associated with transactions being performed upon a typically complex modern circuit, snoop requests and other transactions issued may complete in a different order to that in which they were issued.

The present technique also recognises that it is important that writebacks to the same address complete in the order they were issued. If this is not the case an earlier writeback will overwrite a later writeback and an out-of-date value of a data item will be stored in memory. This has been addressed previously by stalling any response to a snoop request accessing an address for which a writeback is pending and requesting that this request be sent again later. If this is done, any other transaction to this address cannot complete and thus, one can be assured that the writebacks will occur in the correct order. Disadvantages of this technique include the possibility of deadlock situations arising where a stalled snoop is required to complete for another request to complete and also the increased power consumption and latency associated with resending the snoop requests.

Embodiments of the present invention seek to address the problem associated with writebacks occurring out of order without unduly increasing power consumption or reducing performance.

SUMMARY OF THE INVENTION

Viewed from a first aspect, the present invention provides interconnect circuitry for a data processing apparatus, said interconnect circuitry being configured to provide routes for interconnecting a plurality of initiator devices and at least one recipient device, at least one of said at least one recipient device comprising at least one memory for storing at least one data item to be processed by said processing apparatus, at least one of said plurality of initiator devices comprising a cache for storing a local copy of a subset of said data items stored in said at least one memory said interconnect circuitry comprising: a plurality of input ports for receiving transaction requests from said plurality of initiator devices; at least one output port for outputting transaction requests to said at least one recipient device; a plurality of paths for transmitting said transaction requests between said plurality of inputs and said at least one output; coherency control circuitry for maintaining an order in which at least some of said transaction requests to a same data storage location proceed through said interconnect circuitry in order to maintain coherency of data items processed by said data processing apparatus; said interconnect circuitry being configured not to control said writeback transaction requests with said coherency control circuitry, such that said writeback transaction requests proceed independently of transaction requests routed through said coherency control circuitry, said writeback transaction requests being write transaction requests received from said at least one initiator device comprising said cache and being for updating said at least one memory with a locally stored updated value of one of said data items.

The present invention recognises that in systems having multiple copies of a same data item there exist possibilities of this data item being corrupted by an older version overwriting a newer version. In this regard, systems are set up so that the most up-to-date version of a data item is marked as such and if it is stored locally there is a writeback facility provided where at a certain point this new version of the data item is written to memory so that the memory has the updated version. While the memory and the local store have different versions it is important that the version in the local store is marked as being the most recent version so that the incorrect version is not used.

The writing back of this value to memory is not an instant transaction and can take some time. This in itself can cause problems, for example in the case of an initiator device being in the process of writing back an updated version of its value to memory when another initiator device performs a read unique to the same address. A read unique requires that the device doing the read has the only local copy of that data. Thus, a read unique result in queries or snoops being sent to any other masters with local storage to see if they have a copy of the data and if so to return the copy (if it is more up-to-date copy than the copy being read by the read unique) and to invalidate the line. If the master performing the read unique then modifies the data it will need to be written back to the memory in its modified form. If this writeback is performed immediately then there is a risk that it will reach the memory before the earlier writeback has completed. If this occurs then this earlier updated value which is now out-of-date might be written back to the memory after the later writeback has completed and it will then overwrite the new up-to-date value resulting in corruption of the stored data item. The present invention addresses this problem by arranging the writebacks so that they proceed independently of the coherency control and in this way they will not be held up by other actions that the coherency circuitry might otherwise order in front of them. Thus, actions such as the stalling of querying requests can safely be performed without the risk that these actions will result in a system that stalls forever waiting for something that cannot complete.

Furthermore, by providing writeback paths that are not controlled by the coherency control circuitry the delays in these paths are reduced and the writeback is sure to complete and thus, the chances of a writeback being overtaken by another writeback are reduced.

The coherency control circuitry is used to control some transaction requests other than the writebacks to maintain coherency within the system. It can be used to control some or all of the reads. In general all of the reads that might cause a coherency problem are controlled by the coherency control circuitry, thus reads of data that is not cached or sharable do not need coherency control but all other reads should have coherency control.

In some embodiments all of the read transactions are controlled by the coherency control circuitry and in others at least some of the write transactions are controlled but never the writeback transaction requests. In some embodiments the writes that are not controlled are the writebacks and the writes to data items that are not cached and not sharable.

In some embodiments, said transaction requests further comprise cache maintenance requests, said cache maintenance requests being transmitted through said coherency control circuitry.

In addition to read and write transactions, there may be cache maintenance requests that are transmitted through the interconnect. These requests help maintain the coherency of the data stored in the different caches and need to be controlled by the coherency control circuitry. These cache maintenance requests comprise such things as clean unique, which when issued to a cache returns all dirty data to the interconnect and updates the storage locations to invalid. The interconnect is responsible for updating memory.

The interconnect may have paths dedicated to reads and paths dedicated to writes. If this is the case these can be transmitted independently through the interconnect and this enables the writebacks to travel without interference from any reads.

In some embodiments, said cache maintenance requests are transmitted along said read paths.

The cache maintenance requests may be transmitted along any of the paths that are available, but in some embodiments they are transmitted along the read paths. The read paths pass through the cache coherency control circuitry and thus, the cache maintenance operations can be controlled by this circuitry if they follow these paths. This is advantageous as these requests have an effect on coherency and should be controlled by the interconnect.

In some embodiments, said write and read paths that pass through said coherency control circuitry pass through one of at least one point of serialisation.

Coherency control circuitry controls the timing and order that transactions are performed to maintain coherency. Transactions requests that enter this circuitry may pass through a point of serialisation and thus, any transactions ahead of them at this point will affect when these transaction requests are performed. There may be some means of reordering the transactions after the point of serialisation, but they will to some extent be delayed by transaction requests ahead of them by the very nature of passing through a point of serialisation.

In some embodiments said coherency control circuitry is configured to maintain coherency of data items processed by said data processing apparatus by generating querying transactions for avoiding coherency conflicts between locally stored data within a cache on any one of said plurality of initiator devices and a transaction request received from another of said plurality of initiator devices.

The coherency control circuitry may generate querying transactions that query the local stores to see if they are a storing a local copy of a data item requested by transaction request.

In some embodiments, at least one of said input ports comprises a data store associated with it for storing a local copy of a data item being processed by said initiator connected to said at least one port, coherency of said, local copy of said data item being controlled by said coherency control circuitry.

Having a port with a data store associated with it for storing a local copy of a data item can be advantageous. For example, where legacy components which do not have their own local data store are connected to the interconnect, providing a local data store on the interconnect that they can use may enable them to function in a way that is compatible with other devices. Furthermore, where a device does have a cache, provision of a data store on the interconnect allows a data item to be written to that device without allocating a line in the cache. It should be noted however, that writes to this data store from the initiator device pass through the port and thus, will delay other writes issued by the initiator device such as writebacks. Thus, where a system is using such an interconnect it may be that an initiator device needs to limit its writeback function while any writes issued by it are pending in this data store.

It should be noted that when writing to this local data store write uniques are used. These are writes that require that there is only one local copy of the data item that is being written so that there are no stale copies of that data item in any other data store. Thus, in response to a write unique, a query request is sent to other local stores to ensure that any copies of this data item are rendered invalid. If the most recent value of the data item is stored locally then this value is returned prior to it being rendered invalid. It should be noted that although each port may have its own data store, it may be that a single data store is shared between multiple ports, such that each port can use this data store for storing pending write uniques. This clearly has an area advantage but may have performance implications.

Although this data store can take a number of forms in some embodiments it comprises a small cache such as a single line cache.

In some embodiments, at least one of said input ports comprises a means for holding a received transaction request, said at least one input port being configured to transmit at least one query related to said stored transaction request to at least one of said other initiator devices, and in response to receiving a response to associate said response with said held transaction request and to transmit them further.

In some embodiments, rather than having a data store for storing data items to be processed, the system may simply hold a pending transaction request while queries are sent. The results of the query and the transaction requests can then be sent further. This means that the data does not need to be stored locally and this reduces gate count, however, it may increase latency.

In some embodiments, said at least one recipient device is configured to receive both write and read transaction requests and to process said read and write transaction requests in an order determined by a memory controller, said coherency control circuitry being configured not to transmit a read transaction request further until said coherency control circuitry can guarantee completion of said read transaction request.

Some recipient devices may not process reads and writes independently such that one type of transaction may hold up the other type. This can result in backpressure being exerted from the memory controller if the interconnect does not accept reads that are in flight and could result in the recipient device no longer responding to writes. If this is the case, then there is a danger that a writeback that has been sent to a memory device may be held up by a read. It is important that writebacks are not held up by other transactions if one wants to be able to ensure a writeback is complete before performing another transaction. Thus, in embodiments of the present invention the coherency control circuitry is configured not to transmit a read transaction request further until it can be guaranteed to complete. Thus, if there are outstanding transaction requests that might have an effect on the completion of the read it will not be transmitted further and thus, it cannot sit in a recipient device ahead of the writeback request unless it is known that it will proceed to completion.

In some embodiments, said coherency control circuitry is configured in response to receipt of a write unique transaction to write to a storage location, to issue at least one query to at least one of said initiator devices that may store a local copy of a data item stored in said storage location and to only transmit said write transaction further when it is clear from a response to said at least one query that said data will be retrieved by said write transaction.

As a writeback may be held up in a recipient device behind both reads and writes, it is important that both are known to be able to complete before they are issued to the recipient device so that a circumstance where the system is waiting for a writeback to complete before it performs other actions and yet the non-performance of the other actions are stopping the writeback from completing does not occur.

A second aspect of the present invention provides an initiator device comprising: a cache for storing a local copy of at least one of said data items stored in said memory, said at least one initiator being configured to maintain coherency of said locally stored at least one data item, by in response to said locally stored data item being updated, marking said locally stored data item as dirty until said at least one initiator has performed a writeback operation and written said updated data item to said memory; at least one port for transmitting transaction requests to at least one recipient device, and for receiving data and query requests querying said cache; wherein said initiator device is configured not to issue a response to receipt of a request querying a state of a storage location within said cache if a writeback transaction to said storage location is pending, and to issue said response when said pending writeback transaction has completed, said writeback transaction request being a request issued by said initiator device to update said memory with a value of a data item stored in said cache that has itself been updated, such that said memory stores a current value of said data item.

As noted earlier, it is important that a writeback to memory completes before another writeback of a later version of that data reaches the memory. One way of addressing this might be to stall any querying transactions to the storage location of a data item for which a writeback is currently being performed. If this is done, any other transaction to this storage location cannot complete and thus, one can be assured that the writebacks will occur in the correct order. One potential disadvantage of this might be if the writeback itself is not complete because it is held up by the transaction request which is itself pending awaiting a result from the initiator that is stalling until the writeback completes. If however, the interconnect is designed so that the writeback must complete then providing the ability for the initiator device not to reply to any queries while a writeback to that location is pending provides an effective power efficient and fast way of ensuring coherency of writebacks. It should be noted that a previous way of dealing with this was to reply to the query or snoop request by saying that one could not reply now and that this request should be sent again later. A disadvantage of this is the power required to send it later and the timing considerations associated with sending it later.

In some embodiments, said initiator device is configured to issue write unique transactions, write unique transactions being write transactions to a storage location, wherein the write unique transaction ensures that any local copy of a data item stored in said storage location is rendered invalid, said initiator being configured not to issue a writeback transaction while a write unique transaction is pending.

Write unique transactions require that they are writing to the only local copy of a data item and thus, querying requests are sent out in response to write unique transactions to ensure that any other local copies of the data are retrieved and marked as invalid if appropriate or just marked as invalid. A write unique transaction issued from a port of an initiator device which is stalled awaiting responses from its queries can stall a writeback request behind it. Thus, in order to avoid any possibility of the writeback request being stalled in response to a query, an initiator device can be configured not to initiate writeback requests if there is a pending write unique request. Writeback requests do not need to be issued at any particular time as if another initiator needs a copy of that data item it will always query the other local data stores and will find it in any case.

In some embodiments, said initiator device comprises a cache and is configured to issue write unique transactions, write unique transactions being write transactions to a location where said location stores the only local copy of a data item, said initiator being configured not to issue said write unique transactions in response to any of said lines in said cache being dirty.

In some situations, a cache may be designed so that if a query request queries a storage location that is marked as dirty, the cache writes that value to memory rather than returning the data value in response to the query. This ensures that the device requiring that data item can then retrieve it from memory. Although this implementation is slower it requires fewer data paths for transmitting data from one cache to another than the implementation where the dirty data is sent to the device issuing the query. In this implementation, the initiator device must not issue write unique transactions where there are any cache lines that are dirty. This is because access to a dirty line would trigger a writeback for this implementation and writeback transactions are not allowed while write uniques are pending, but in this case the writeback transactions are required and cannot be delayed, thus write uniques should not be allowed in this case.

A third aspect of the present invention provides a data processing apparatus comprising a plurality of initiators configured to issue a plurality of transaction requests; at least one recipient configured to receive said plurality of transaction requests, at least one of said at least one recipient comprising a memory for storing data items processed by said data processing apparatus; at least one of said plurality of initiators comprising an initiator according to a second aspect of the present invention; and interconnect circuitry according to a first aspect of the present invention.

Providing a system where writebacks are guaranteed to complete allows any queries to a storage location where a writeback is pending to be delayed until the writeback has completed and avoids any possibilities of writebacks completing in an incorrect order. This allows an initiator device with the ability to stall a query request to be connected to the interconnect.

In some embodiments, where the interconnect circuitry has local data stores enabling write uniques to be performed by initiator devices writing to the interconnect then it may be advantageous to use initiators which do not allow writebacks to occur where a write unique is pending or do not allow write uniques to occur where there is a dirty line in the cache if the design is such that writebacks are triggered by query requests.

It should be noted that although in some embodiments the initiators may all have caches, in others there may be at least some that don't.

A fourth aspect of the present invention provides a method of maintaining coherency comprising the steps of: issuing a writeback request from an initiator comprising a cache to a memory via an interconnect, said writeback transaction request being a write transaction request for updating said memory with an updated value of a data item stored locally on said cache; allowing said writeback request to proceed through said interconnect independently of transaction requests routed through a coherency control circuitry, in response to receipt of a request at said initiator querying a state of a storage location in said cache for which said writeback transaction is pending, not responding to said querying request until said pending writeback transaction has completed.

The above, and other objects features and advantages of this invention will be apparent from the following detailed description of illustrative embodiments which is to be read in connection with the accompanying drawings.

DESCRIPTION OF THE PREFERRED EMBODIMENTS

Figure 1:
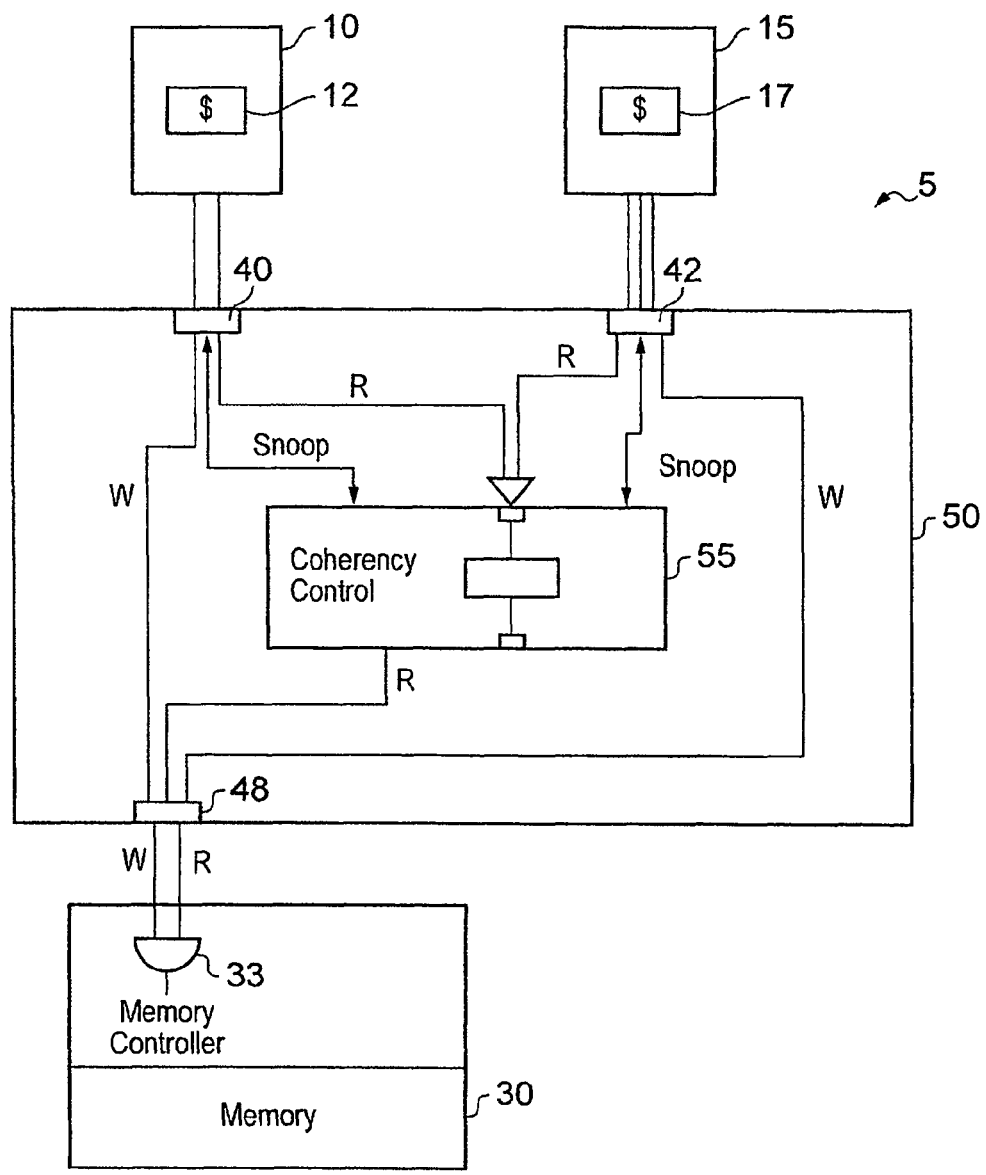
FIG. 1 schematically shows a data processing apparatus according to an embodiment of the present invention.

FIG. 1 shows a data processing apparatus 5 according to an embodiment of the present invention. Data processing apparatus 5 comprises two initiator devices 10 and 15 an interconnect 50 and a memory 30. Initiator device 10 has a cache 12 for storing local copies of data and communicates with the interconnect 50 via input port 40. Input port 40 receives transaction requests and data from initiator device 10 and transmits these to the interconnect, it also receives querying or snoop requests from the interconnect 50 and transmits these to initiator device 10. Initiator device 15 communicates with interconnect 50 via input port 42 and transmits transaction requests to the interconnect 50 through this port. Interconnect 50 comprises coherency control circuitry 55 which maintains an ordering of transaction requests received and performs operations to ensure that coherency of data items is maintained.

It should be noted that an initiator is a device that transmits a transaction request to the interconnect via an input port. The initiator may receive requests in the form of querying or snoop requests from the interconnect via the input port. A recipient is a device such as a memory that receives requests.

The caches in this system are writeback caches, that is caches that in response to a write will cause the line to be fetched in to the cache and locally modified causing the state to be updated to dirty indicating that a version of the data item that is more recent than a version of that data item stored in the memory is stored in the cache. Later a writeback is performed to write this value to memory whereupon the state is updated to clean (meaning it holds the same value as the value in memory). A cache entry that is clean is not responsible for updating memory so can safely and silently transition to the invalid state. A cache entry that is dirty cannot transition to invalid, it first needs to write its data back to memory, and when this completes, the state can transition to clean and then it can optionally transition to invalid. Alternatively a snoop is received to the same cache entry, the responsibility for updating the memory can be passed to the interconnect with the snoop response, whereupon the state of the cache entry can transition to invalid.

In this embodiment all of the initiators issue reads as read uniques, which means that only one local copy of that data item is stored. Thus, in response to a read unique the up-to-date version of the data item is fetched and all other local versions are marked as invalid. If the data value is read from another cache then the dirty/clean state of that entry in the cache will migrate with the data.

A potential problem with a read unique can occur where an initiator performs a writeback at about the same time as another initiator performs a read unique. This may result in a race as to which the coherent interconnect handles first. If the writeback is issued before the read unique snoop is seen by the cache that the writeback is from, then the data could be retrieved by the read unique before the writeback has hit the memory. This is a potentially bad situation as the data read could then be modified and that initiator could perform its own writeback which could race the writeback from the first initiator. If this latter completed first then the first issued writeback will corrupt the data in the memory with the old value.

This potential problem is addressed by the device in FIG. 1.

In the data processing apparatus of FIG. 1 in response to a read unique transaction request from initiator device 15 the coherency control circuitry 55 will send a query request in the form of a snoop signal via port 40 to initiator device 10. It should be noted that although in this embodiment port 40 is shown as a single port, the skilled person will understand that there may be multiple ports for receiving these signals. For example one port for receiving the read and write channels from initiator 10 and a separate port for handling the snoop channels. This query will query the status of cache 12 and determine if the data item that is the subject of the read is stored there. If it is it will retrieve the data and mark the location as invalid unless the line is subject to a current writeback in which case the snoop response will be stalled until that writeback has completed. If the data is retrieved then this data is returned to cache 17 and cache 17 is then marked as dirty if the storage location in cache 12 had been marked as dirty. At some later point any dirty value that is stored in cache 17 may need to be written to memory 30 so that memory 30 holds the most recent value of the data item. Thus, at some point initiator device 15 will issue a writeback transaction request and this will be routed not via coherency control circuitry 55 but directly to memory 30. This is done to ensure that it proceeds through the interconnect to output port 48 and its progress is not impeded by any coherency control operations from coherency control circuitry 55. This is done so that if a querying or snoop request is received at one of the initiator devices when a writeback is pending it can safely be stalled until the writeback has completed. This is only possible if one is sure that the writeback will complete. Enabling a snoop or querying request to be stalled in this manner means that problems that might arise were for example the read unique to retrieve the data from the cache while the cache was performing a writeback for that item and then itself perform a writeback of that data item to memory are avoided.

In addition to not transmitting the writeback to coherency control circuitry there are further rules that the interconnect follows to be sure that the writeback is guaranteed to complete.

Looking at memory 30 one sees that although there are separate read and write paths going to this memory inside memory controller 33 they may combine to form a single path.

Thus, writes and reads will be performed in an order defined by the memory and will need to wait for each other to complete. Thus, coherency control circuitry 55 is configured to only issue read transactions to memory 30 where it knows that they are sure to complete. Similarly, it only issues write transactions where it can also be sure that they will complete. This ensures that a writeback transaction does not get held up indefinitely behind another transaction that is waiting for something before it can complete.

Figure 2:
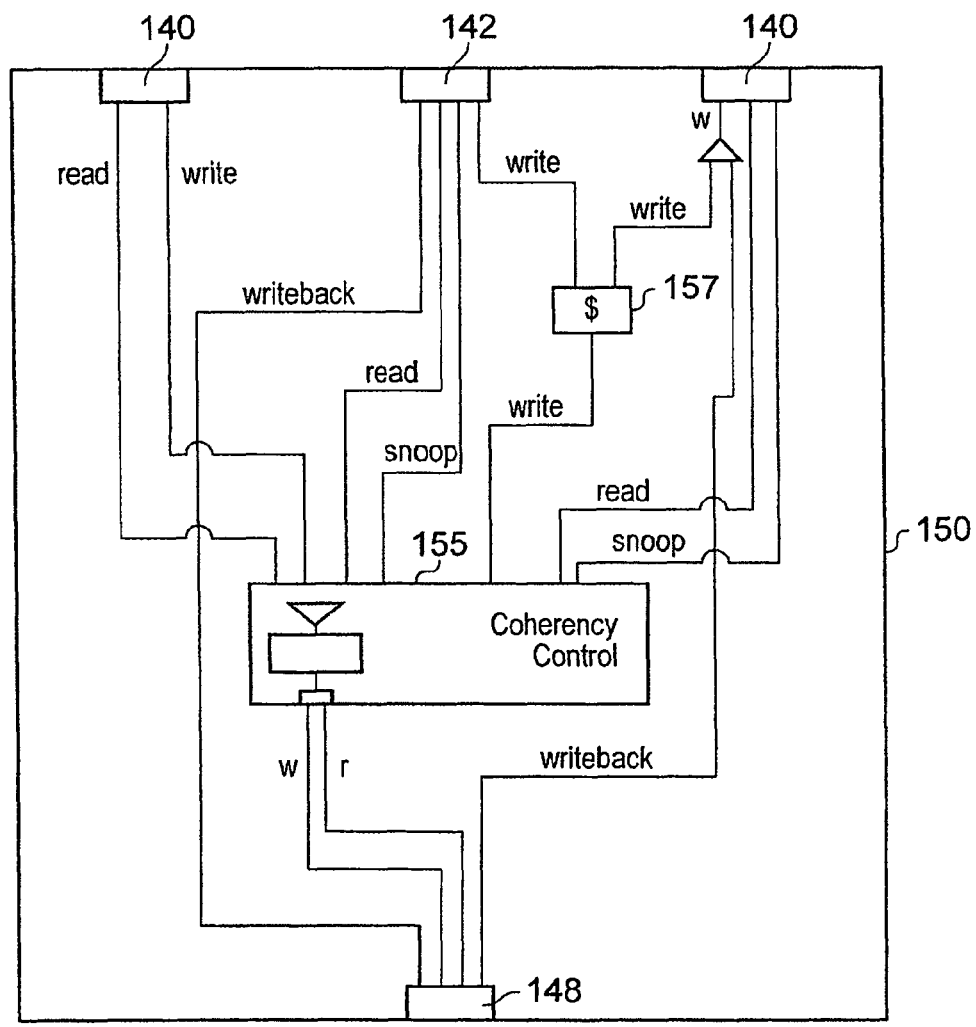
FIG. 2 schematically shows interconnect circuitry having coherency control circuitry.

FIG. 2 shows an interconnect 150 according to a second embodiment of the present invention. In this embodiment there are input ports 140, 142 and 144 for connection to initiator devices. The initiator device connected to input port 140 has no cache and thus, there is no snoop line to this port. There is also an output port 148 to a recipient device or memory.

In this interconnect there is some local storage within the interconnect itself. Local storage 157 comprises in this embodiment a single line store and it enables initiator device 140 and 142 to perform writes without allocating lines in their own caches. It should be noted that in some embodiments there might be separate local storage provided for each initiator device, while in others such as this embodiment there may be shared local storage, while in still others no local storage will be provided.

Local storage on the interconnect can also be used with initiator devices that do not have their own caches.

Write transactions that are received at input port 140 and 142 may write to single line store 157 and may pass through coherency control circuitry 155 which generates snoop requests. Writeback transactions received from the initiator devices at input port 140 and 142 are diverted and are not sent via coherency control circuitry 155 but are sent directly to the output 148 connected to memory. Coherency control circuitry 155 performs coherency operations in response to read and write transactions that it receives. Thus, in response to a write transaction sent to the single line store 157, coherency control circuitry 155 determines if the data item that has been written is present in any local storage by performing snoop operations and if it is it marks the storage locations as invalid.

Figure 3:
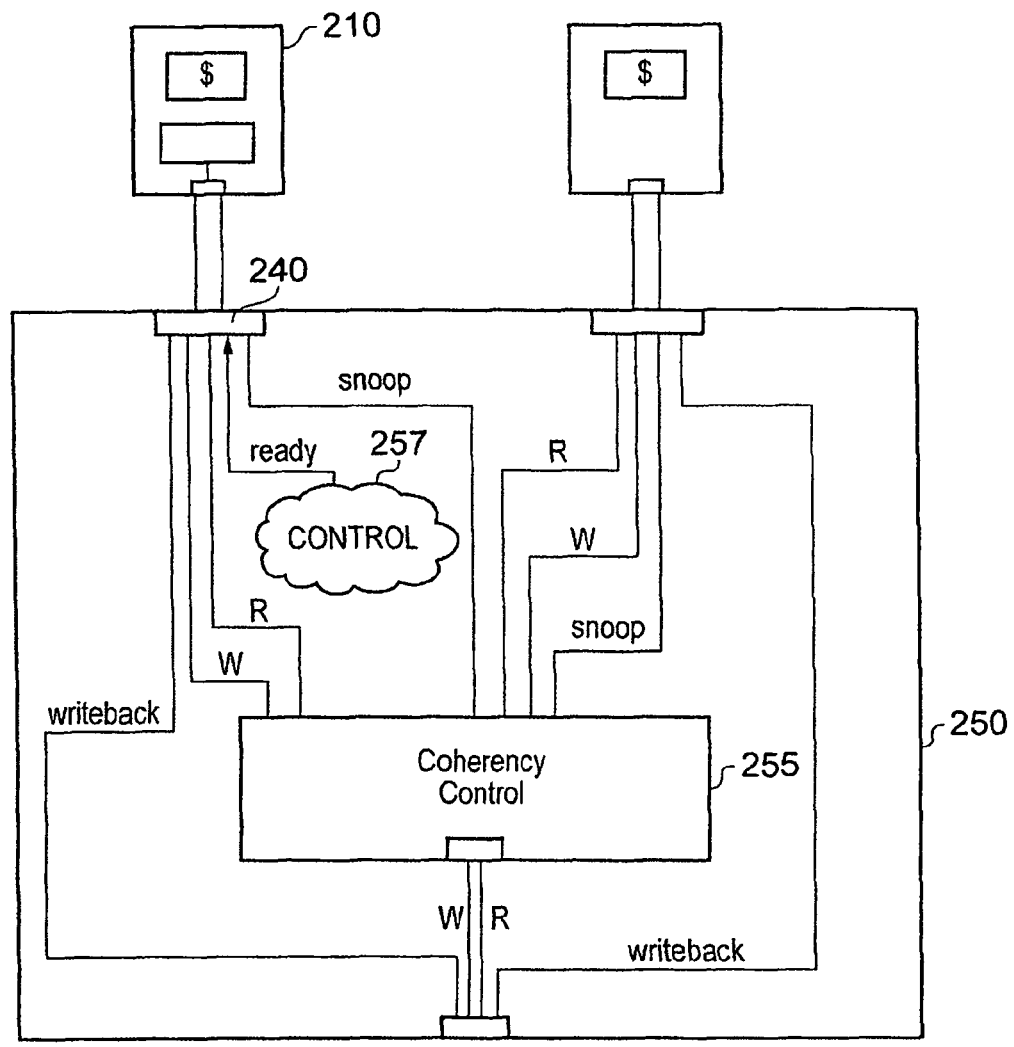
FIG. 3 schematically shows interconnect circuitry connected to two masters.

FIG. 3 shows an alternative embodiment of the interconnect of FIG. 2. In this embodiment interconnect 250 has control logic 257 rather than a single line store 157. This control logic in response to a receipt of a write transaction from initiator device 210 does not immediately send a ready signal back to the initiator device 210 such that the initiator device holds the write transaction on its pins until a ready signal is sent. Thus, this write transaction is continually output via input port 240 and any snoop actions required can be performed by control circuitry 257 and when a result is achieved this result and the write transaction can be sent further. At this point, control circuitry 257 sends a ready signal to initiator device 210 telling it to proceed further and output the next transaction. This saves storage space on the interconnect but has latency implications. Once again in this embodiment there are separate writeback channels within the interconnect to enable writeback to occur independent of the coherency control. It should be noted that the write transaction may be sent as multiple data beats, thus the address is on the address write, channel and when a ready signal is received the subsequent data beats are sent.

Caches used in embodiments of the present invention may be of different types for example, either MEI or MOESI. MEI caches are those that support the modified (unique dirty), exclusive (unique clean) and the invalid state only (see FIG. 5). While MOESI caches support the owned (shared dirty) and shared (shared clean) states too.

Figure 4:
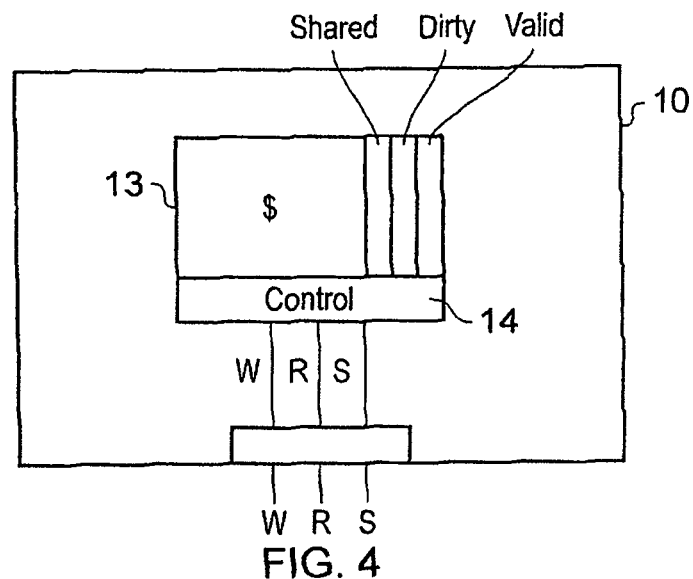
FIG. 4 schematically shows a master having a cache.

FIG. 4 shows an embodiment showing master or initiator device 10 having a MOESI cache 13. This cache 13 stores a number of data items and associated with each are indicators which indicate whether the stored item is valid, dirty or shared. Cache 13 also has control circuitry 14 for controlling write transactions, read transactions and snoop transactions received at the cache.

A valid indicator indicates that the data within the cache is valid, while an invalid indicator indicates that it should not be used. A dirty indicator indicates that this is an updated version of the data and is a more recent version than the data in the memory and that this cache is responsible for writing the data back to memory. A shared indicator indicates whether or not it is a unique copy of the data or whether there is another local copy somewhere else.

Control circuitry 14 is configured to control the transactions received and in particular, in response to receiving a snoop transaction to a particular storage location it determines whether there is a writeback pending for that storage location (in general a same storage location is one with a same address, thus there may be multiple ones of the same storage location in that multiple copies of a data item stored at a particular address are held, some being local copies perhaps stored in a cache and others being a copy held in memory. A writeback will always write back towards memory, it may be to memory itself or it may be to a cache that is downstream of the coherent interconnect). If there is a writeback pending then control circuitry 14 stalls the snoop and does not allow it to proceed until the writeback has completed. In this way, coherency issues that might arise due to writebacks occurring out of order are avoided as any later transaction to the address for which a writeback is pending do not proceed. Once the writeback has completed then the snoop is allowed to proceed.

Control circuitry 14 also acts to prevent writebacks being issued by the initiator device 10 where a write unique transaction is pending. This is because a write unique transaction can interfere with the writeback and prevent it from completing as there are snoop requests and cache maintenance operations that might be generated by the write unique.

It should be noted that writebacks do, not generally have to be performed at a certain time as although they keep the memory up-to-date, if the memory is not up-to-date any other write or read transaction will snoop the cache that holds the up-to-date value and will determine that it is the most recent value from the dirty flag. At this point, it will transmit the up-to-date data in response to the transaction request and will in some cases mark the line as invalid. In other cases the snoop may not require the line to be invalidated in which case it may transfer the data and keep the line in a shared state. Thus, a writeback can generally be performed when convenient and it is acceptable not to allow a writeback to be issued while a write unique is pending.

Figure 5:
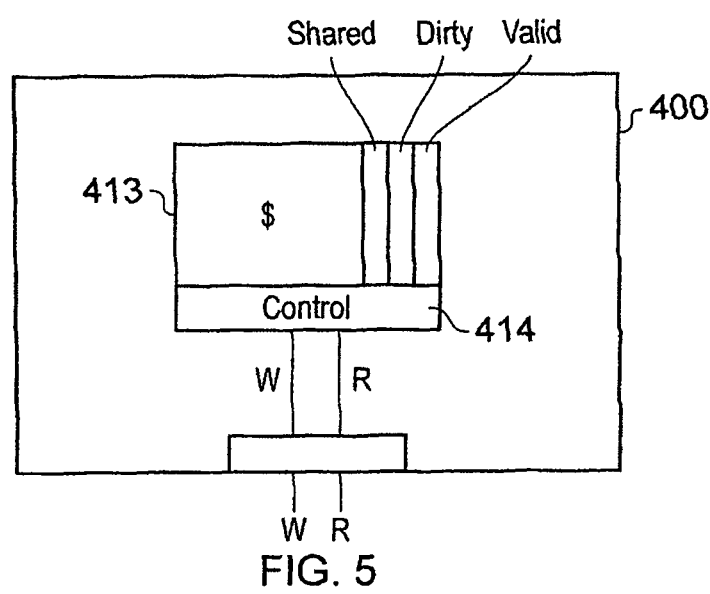
FIG. 5 schematically shows a master having a differently configured cache to that of FIG. 4.

FIG. 5 shows an alternative embodiment with an initiator device 400 having a cache 413 and control circuitry 414. There are no separate snoop data channels in this device, however, there are snoop address and response channels. Furthermore, in this embodiment although not shown there is no channel for transmitting data from this initiator to another initiator, thus, in response to a snoop signal any dirty item snooped must be written to memory, so that the up-to-date value for this item can be retrieved from the memory by the transaction that generated the snoop. This means that in this embodiment write uniques cannot be issued while there are dirty items in the cache as a snoop to a dirty item will generate a writeback, which could result in a write unique being stuck in a queue behind a snoop that is stalled.

It should be noted in some embodiments a writeback is considered to be complete when a signal has been received indicating that it has reached a certain point, that point being one through which all writebacks will travel and where there is circuitry to maintain the ordering beyond this point.

Figure 6:
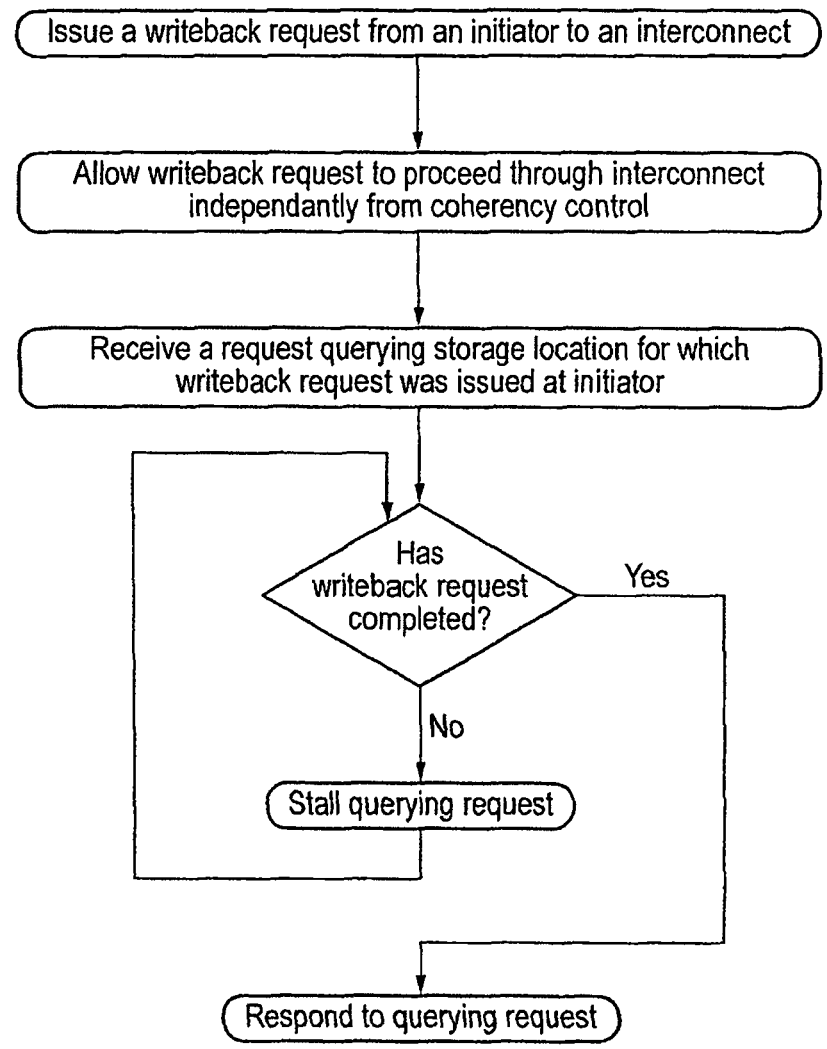
FIG. 6 shows a flow diagram illustrating steps in a method ensuring ordering of writeback requests to be maintained according to an embodiment of the present invention.

FIG. 6 shows a method according to an embodiment of the present invention. In this embodiment a writeback request is issued from an initiator to an interconnect. The interconnect allows the writeback request to proceed through the interconnect independent of any coherency control. The initiator device receives a request querying the storage location for which the writeback request was issued. The initiator device determines if the writeback request has completed. If it hasn't it stalls the querying request. If it has completed then it responds to the querying request, provided another writeback is not issued at this time. If a writeback is issued then, although this is not shown, the writeback will be allowed to proceed before the querying request is responded to. In this way no coherency problems arise through writebacks occurring out of order.

Figure 7:
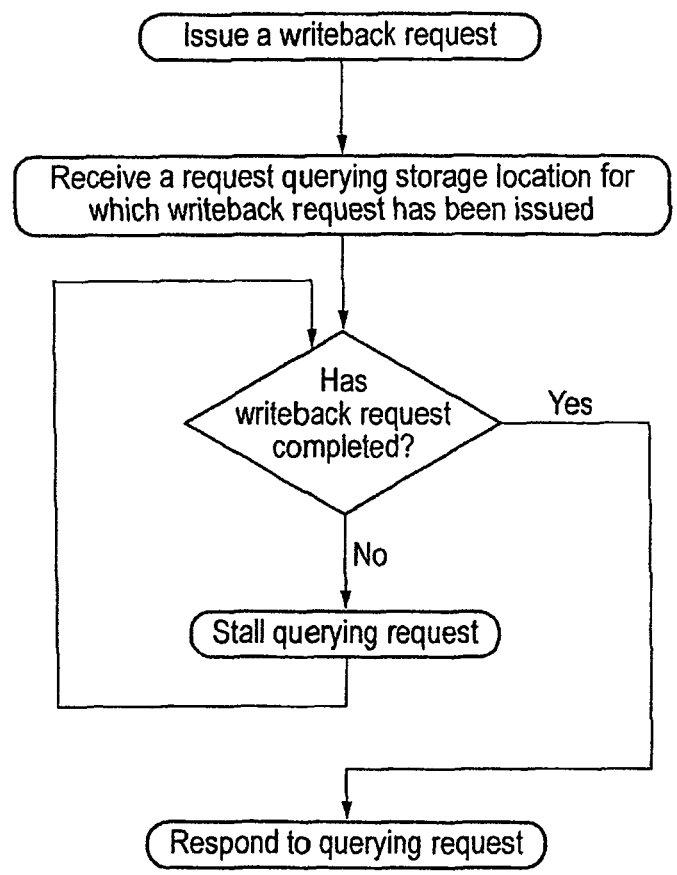
FIG. 7 shows a flow diagram illustrating steps in a method performed within an initiator device according to an embodiment of the present invention.

The method steps that occur, within, the initiator rather than within the whole data processing system are shown in FIG. 7. Firstly the initiator issues a writeback request and then it receives a request querying the storage location for which the writeback request has been issued. It then determines if the writeback request is complete. If it isn't it stalls the querying request and when it does determine that the writeback is complete it responds to the querying request.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Interconnect circuitry for a data processing apparatus, said interconnect circuitry is configured to provide routes for interconnecting a plurality of initiator devices and at least one recipient device, at least one of said at least one recipient device comprising at least one memory for storing at least one data item to be processed by said data processing apparatus, at least one of said plurality of initiator devices comprising a cache for storing a local copy of a subset of said data items stored in said at least one memory said interconnect circuitry comprising:

a plurality of input ports configured to receive transaction requests from said plurality of initiator devices;
at least one output port configured to output transaction requests to said at least one recipient device;
a plurality of paths configured to transmit said transaction requests between said plurality of inputs and said at least one output;
coherency control circuitry configured to maintain an order in which at least some of said transaction requests to a same data storage location proceed through said interconnect circuitry in order to maintain coherency of data items processed by said data processing apparatus;
said interconnect circuitry is configured to not control a writeback transaction request with said coherency control circuitry, such that said writeback transaction request proceeds independently of transaction requests routed through said coherency control circuitry, said writeback transaction request is a write transaction request received from said at least one initiator device comprising said cache and updating said at least one memory with a locally stored updated value of one of said data items.

2. Interconnect circuitry according to claim 1, wherein said transaction requests comprise read transaction requests and write transaction requests, at least some of said read transaction requests being controlled by said coherency control circuitry.

3. Interconnect circuitry according to claim 2, wherein all of said read transaction requests are controlled by said coherency control circuitry.

4. Interconnect circuitry according to claim 2, wherein at least some of said write transaction requests but not said writeback transaction requests are controlled by said coherency control circuitry.

5. Interconnect circuitry according to claim 2, said transaction requests further comprising cache maintenance requests, said cache maintenance requests being transmitted through said coherency control circuitry.

6. Interconnect circuitry according to claim 1, wherein said plurality of paths comprise read paths for transmitting read transaction requests and write paths for transmitting write transaction requests.

7. Interconnect circuitry according to claim 6, said transaction requests further comprising cache maintenance requests, said cache maintenance requests transmitted through said coherency control circuitry, wherein said cache maintenance requests are transmitted along said read paths.

8. Interconnect circuitry according to claim 1, wherein write and read paths, passing through said coherency control circuitry, pass through one of at least one point of serialisation.

9. Interconnect circuitry according to claim 1, wherein said coherency control circuitry is configured to maintain coherency of data items processed by said data processing apparatus, by generating querying transactions for avoiding any coherency conflicts between locally stored data within a cache on any one of said plurality of initiator devices and a transaction request received from another of said plurality of initiator devices.

10. Interconnect circuitry according to claim 1, wherein at least one of said input ports comprises an associated data store configured to store a local copy of a data item being processed by said initiator connected to said at least one input port, coherency of said local copy of said data item is controlled by said coherency control circuitry.

11. Interconnect circuitry according to claim 10, wherein said data store comprises a small cache.

12. Interconnect circuitry according to claim 1, wherein at least one of said input ports comprises means for holding a received transaction request, said at least one input port configured to transmit at least one query related to said held transaction request to at least one of said other initiator devices, and in response to receiving a response, to associate said response with said held transaction request and to transmit them further.

13. Interconnect circuitry according to claim 1, wherein said at least one recipient device is configured to receive both write and read transaction requests and to process said read and write transaction requests in an order determined by a memory controller, said coherency control circuitry configured not to transmit a read transaction request further until said coherency control circuitry can guarantee completion of said read transaction request.

14. Interconnect circuitry according to claim 1, wherein said coherency control circuitry is configured to not transmit a write unique transaction to a storage location before issuing at least one query to at least one of said initiators to determine if said at least one initiator is currently storing a local copy of a data item stored in said storage location and to only transmit said write unique transaction further when it is clear from a response to said at least one query that said data will be retrieved by said write unique transaction, wherein write unique transactions are write transactions to a storage location that ensure that any local copy of a data item stored in said storage location is rendered invalid.

15. An initiator device comprising:
a cache for storing a local copy of at least one data item stored in a memory, said initiator device configured to maintain coherency of said locally stored at least one data item, by in response to said locally stored data item being updated, marking said locally stored data item as dirty until said initiator device has performed a writeback operation and written said updated data item to said memory;
at least one port for transmitting transaction requests to at least one recipient device, and for receiving data and query requests querying said cache; wherein
said initiator device is configured to not issue a response to receipt of a request querying a state of a storage location within said cache if a writeback transaction to said storage location is pending, and to issue said response when said pending writeback transaction has completed, said writeback transaction request comprising a request issued by said initiator device to update said memory with a value of a data item stored in said cache that has itself been updated, such that said memory stores a current value of said data item.

16. An initiator device according to claim 15, said initiator device is configured to issue write unique transactions, write unique transactions comprising write transactions to a storage location, wherein the write unique transaction ensures that any local copy of a data item stored in said storage location is rendered invalid, said initiator is configured not to issue a writeback transaction while a write unique transaction is pending.

17. An initiator device according to claim 15, said initiator device comprises a cache and is configured to issue write unique transactions, write unique transactions comprising write transactions to a location where said location stores the only local copy of a data item, said initiator being configured not to issue said write unique transactions in response to any of said lines in said cache being dirty.

18. A data processing apparatus comprising:
a plurality of initiators configured to issue a plurality of transaction requests;
at least one recipient configured to receive said plurality of transaction requests, at least one of said at least one recipient comprising a memory for storing data items processed by said data processing apparatus;
at least one of said plurality of initiators comprising an initiator, said initiator comprising:
a cache for storing a local copy of one data item stored in a memory, said initiator is configured to maintain coherency of said locally stored data item, by, in response to said locally stored data item being updated, marking said locally stored data item as dirty until said initiator has performed a writeback operation and written said updated data item to said memory;
at least one port for transmitting transaction requests to at least one recipient device, and for receiving data and query requests querying said cache; wherein
said initiator device is configured not to issue a response to receipt of a request querying a state of a storage location within said cache if a writeback transaction to said storage location is pending, and to issue said response when said pending writeback transaction has completed, said writeback transaction request being a request issued by said initiator device to update said memory with a value of a data item stored in said cache that has itself been updated, such that said memory stores a current value of said data item; and
interconnect circuitry according to claim 1.

19. A data processing apparatus according to claim 18, said interconnect circuitry being interconnect circuitry, wherein at least one of said input ports comprises an associated data store is configured to store a local copy of a data item being processed by said initiator connected to said at least one input port, coherency of said local copy of said data item is controlled by said coherency control circuitry, said initiator connected to said at least one port comprising an initiator device, said initiator device configured to issue write unique transactions, write unique transactions are write transactions to a storage location, wherein the write unique transaction ensures that any local copy of a data item stored in said storage location is rendered invalid, said initiator being configured not to issue a writeback transaction while a write unique transaction is pending.

20. A data processing apparatus according to claim 18, wherein at least one of said initiators does not comprise a cache.

21. A method of maintaining coherency comprising the steps of:
issuing a writeback request from an initiator comprising a cache to a memory via an interconnect, said writeback transaction request is a write transaction request for updating said memory with an updated value of a data item stored locally on said cache;
allowing said writeback request to proceed through said interconnect independently of transaction requests routed through a coherency control circuitry,
in response to receipt of a request at said initiator querying a state of a storage location in said cache for which said writeback transaction is pending, delaying responding to said querying request until said pending writeback transaction has completed.

* * * * *